April 28, 1959     H. J. HOMER ET AL     2,884,337
METHOD FOR MAKING METALLIZED PLASTIC FILMS
Filed June 3, 1955
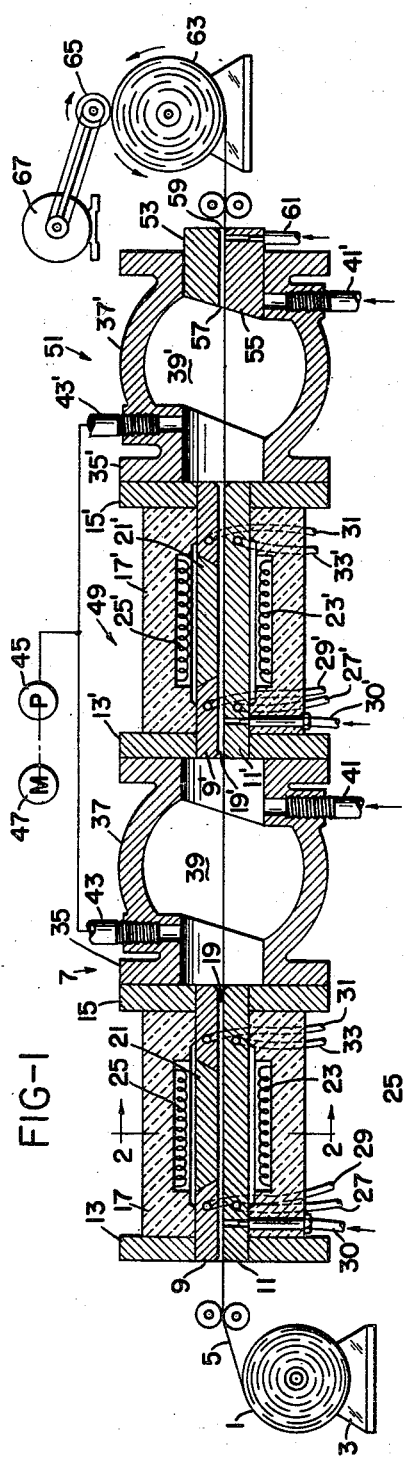
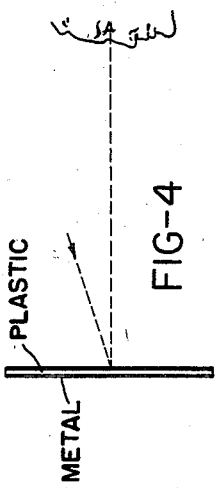
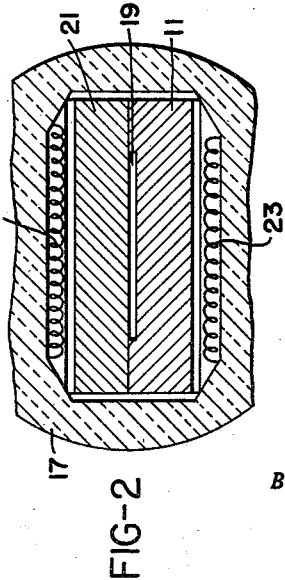
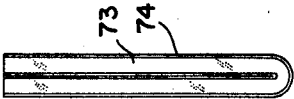
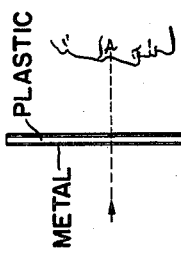
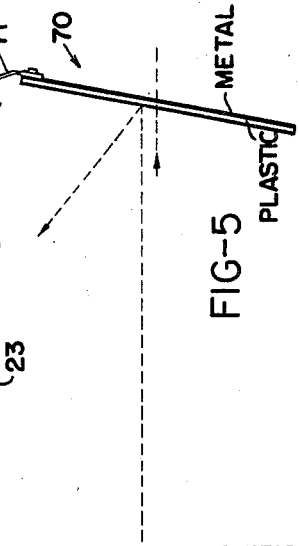
*INVENTOR.*
HOWARD J. HOMER
JOHN R. WHITACRE
BY Toulmin & Toulmin
ATTORNEYS United States Patent Office 2,884,337
Patented Apr. 28, 1959

2,884,337

METHOD FOR MAKING METALLIZED PLASTIC FILMS

Howard J. Homer and John R. Whitacre, Dayton, Ohio, assignors to The Commonwealth Engineering Company of Ohio, Dayton, Ohio, a corporation of Ohio Application June 3, 1955, Serial No. 513,002

1 Claim. (Cl. 117—47)

This invention relates to the metallization of films and to the products of the metallization.

The invention particularly contemplates the metallization of films of heat fusible or combustible materials such as cellophane, cellulose acetate and mylar. However other film materials are applicable to the invention process particularly those organic materials in film form which have good light transmission characteristics.

The invention specifically contemplates the production of metallized films having utility in light filter and mirror applications. One outstanding feature of the product is its utility in environments where both the above-noted properties are involved as well as the elimination of static electricity; thus the product is useful as a visor on moving vehicles to eliminate glare while presenting a mirror-like appearance at a distance, and when framed in metal, the development of static charge due to vehicle movement is inhibited.

The films in the practice of this invention are metallized by heating the film and while the sensible heat and integrity of the film are retained the film is subjected to an atmosphere of a heat decomposable metal bearing compound which is decomposable at the temperature of the film to deposit metal on the film. Thereafter the film is removed from the gaseous atmosphere and cooled.

The product of the metallizing is a mirror-like metallic surface on the film. If held close to the eyes the composite product is transparent when the metal coatings are thin and when the original film is transparent. However at a distance from the eye, as at arms length, the composite appears opaque, is highly reflective and decorative.

In addition to the foregoing characteristics the film is much decreased in vapor permeability, is heat reflective and substantially as flexible as the original film. With most films of organic nature if they are doubled upon themselves and creased the crease remains; while the crease remains in the metallized film of this invention the resiliency of the material is increased and upon doubling upon itself and release, the metallized film springs back much more quickly than the unmetallized. Further there is no separation of metal from the film nor do cracks occur in the metal upon such creasing.

The amount of metal required to completely cover the film to secure a light filter effect is surprisingly small. This is attributed to the fine dispersion of the metal and the maner in which it integrates with the film when the metal is deposited on the heated film.

The invention will be more fully understood by reference to the following detailed description and accompanying drawings wherein:

Figure 1 is a view partially in section of apparatus useful in the practice of the invention;

Figure 2 is a sectional view taken on line 2—2 of Figure 1;

Figure 3 is a view illustrating the transparency of the product to an individual when the product is held close to the eye;

Figure 4 is a view illustrating the reflectivity of the product when the same is held at arms length;

Figure 5 is a view illustrating the use of the product of invention in a car visor; and Figure 6 is a view illustrating the film of invention bent upon itself.

Referring to the drawings there is shown at 1 in Figure 1 a roll of tape constituted of cellulose acetate. The tape is supported in any suitable manner as indicated at 3 and in the practice of the invention is drawn rightwardly in thin film form 5 into the apparatus indicated generally at 7.

This apparatus is constituted by an upper metal plate 9, a lower metal plate 11 and end flanges 13, 15. The combination of plates is surrounded by insulation 17; the lower plate is slotted as indicated at 19 in Figure 2 to provide a passage through the plate for the film 5.

As shown in Figure 1 the upper plate has a cut-out portion 21 which may be removed from the combination of the plates to view or to clean the slot 19. Heating coils 23, 25 are respectively provided on either side of the plates 11, 9; the plates are interconnected at their opposite ends by a conduit through which a cooling liquid flows to maintain the ends of the plates cool.

As shown at 27, 29 in Figure 1 there are inlet and outlet conduits at the left hand end of the assembly for the continuous flow of cooling liquid into and out of the apparatus. Also at the left hand end in Figure 1 there is provided an inlet conduit 30 for the flow of a gas into the slot 19 at the left hand end to prevent the entry of air into the slot. Carbon dioxide, for example, may be fed through the conduit 30, expelled out the left hand end of the slot, and thus inlet of air to the slot is inhibited.

The conduits for the passage of cooling liquid at the right hand end of the plates 9, 11 are indicated at 31, 33. The leads for supplying current to the coils 23, 25 most suitably enter the assembly through insulation 17 in any customary manner.

Connected to the flange 15 as shown in Figure 1 rightwardly is a flange 35 of a housing 37 which defines a gas plating chamber indicated at 39. A thermally decomposable gas such as nickel carbonyl may be supplied to the plating chamber 39 through conduit 41 and gases of decomposition as well as any undecomposed gases will be expelled through conduit 43, which conduit is connected to a vacuum pump 45 and a motor 47.

A similar heating and plating chamber to that already described are indicated generally at 49, 51, respectively, and since these are identical in every respect to the previously described heating and plating chamber, it is not considered necessary to specifically set forth each of the elements, the elements having been given the same numbers but primed as in the left hand portion of the figure.

Similar to the plating chamber 51 rightwardly are plates 53, 55 defining a channel 57 through which the film emanates to the atmosphere. These plates are provided at 61 with a conduit through which gas, such as carbon dioxide, is fed to prevent the inlet of air into the slot.

The film emanating from the slot 59 is wound up as indicated at 63, the actuating mechanism, including a friction drive unit indicated at 65 and a motor 67, providing the appropriate winding speed.

In the practice of the invention the tape as indicated at 5 is passed into the the apparatus generally indicated at 7 and the tape as it slides over the metal defining the slot 19 is heated and in the case of cellulose acetate which is to be plated with nickel, the cellulose acetate is suitably moved at a speed of 15 feet per minute through the plating train, the heater being at a temperature of approximately 280° F. Nickel carbonyl at a flow rate of about 1.8 cubic feet per minute at atmospheric pressure is passed into the chamber 39 and since the cellulose acetate film retains the sensible heat given it, the nickel carbonyl decomposes depositing nickel on the film.

This process is repeated in the heater 49 and the plating chamber 51 and a film which is transparent and 5 mils thick when it enters the unit will have a metallic appearing surface as it emanates through the slot 59 to be wound up at 63. The metal deposit from a thickness point of view is substantially insignificant, but the deposit is light dispersing and the film when held close to the eye, as indicated in Figure 3, would appear to be transparent, the light indicated by the dotted line coming to the eye being considerably free of glare. When the metallized film is held at arm's length or further, as indicated in Figure 4, the film will have all the properties of a mirror clearly reflecting objects. Light from the side opposite the viewer will substantially not be transmitted to the eye of the viewer.

As indicated in Figure 5 the product may be used as a car visor wherein, due to the capacity of the metallized film for filtering and dispersing strong light rays, the unit indicated at 70 is effective for the elimination of glare. In this same connection to a driver approaching from an opposite direction the visor will appear shiny or mirror-like and will not be transparent and present a reflection of light to indicate the approach of the car at a very considerable distance, which is useful, for example, in night driving. The reflection of the light is indicated by the dotted line at the left in Figure 5. Further the frame indicated at 71 in Figure 5 being of metal the car visor will not retain static charge. Such a film may suitably be of 0.2 to 0.3 thickness of nickel on cellulose acetate.

An important characteristic of the film is most clearly indicated in Figure 6 wherein the film 73 is illustrated to be bent substantially double upon itself without separation of the metal 74.

While the invention thus far has been described with particular relation to the specific deposition of nickel on cellulose acetate, other metals, either iron or chromium derived respectively from iron pentacarbonyl and chromium hexacarbonyl, may be substituted for the nickel in the practice of the invention. Iron when so utilized, probably because of its purity, resists the tendency of normal iron bodies to rust.

Similarly, it has been found that tapes of mylar or cellophane may be effectively substituted for the cellulose acetate.

It will be understood that this invention is susceptible to modification in order to adapt it to different usages and conditions and accordingly, it is desired to comprehend such modifications within this invention as may fall within the scope of the appended claim.

We claim:

A method of making a metallized transparent tape of cellulose acetate sheet material which is light transmittant and flexible, said method comprising moving a continuous length sheet of transparent cellulose acetate material continuously along, subjecting the sheet of material to heat to raise the temperature of the sheet to approximately 280° F. while moving the cellulose acetate sheet along lengthwise at a speed of approximately 15 feet per minute, advancing the heated sheet immediately into a gas plating chamber filled with a flowing stream of gaseous nickel carbonyl, maintaining the flow of nickel carbonyl through the plating chamber at a flow rate of about 1.8 cubic feet per minute and at substantially atmospheric pressure and in contact with the heated cellulose acetate sheet material whereby thermal decomposition of the gaseous nickel carbonyl takes place and nickel metal is deposited onto the heated moving sheet of cellulose acetate, said nickel metal deposit being of uniform thickness and such as to form a thin film of metal on the sheet which is transparent to light, and wherein the sheet retains substantially its original flexibility.

References Cited in the file of this patent
UNITED STATES PATENTS

| | | |
|---|---|---|
| 2,333,534 | Lang | Nov. 2, 1943 |
| 2,382,432 | McManus et al. | Aug. 14, 1951 |
| 2,628,927 | Colbert et al. | Feb. 17, 1953 |
| 2,698,812 | Schladitz | Jan. 4, 1955 |
| 2,726,179 | Ortlieb et al. | Dec. 6, 1955 |